Figure 1:
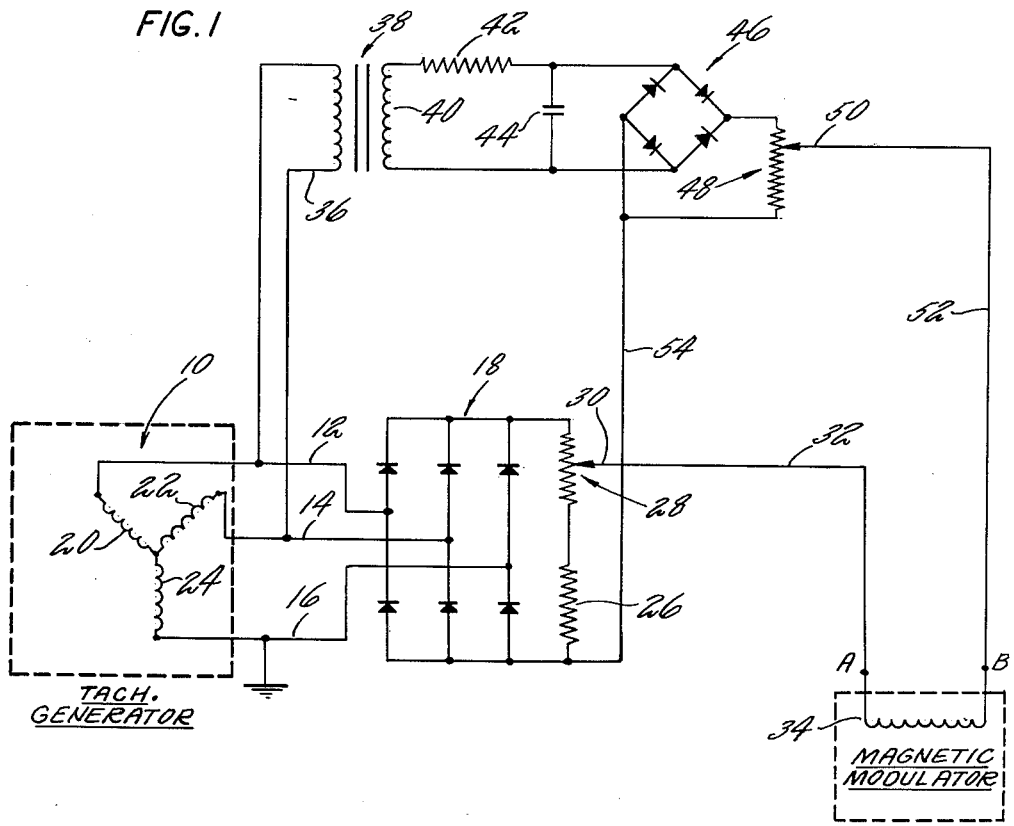

July 10, 1962 W. C. PECK 3,044,013
THREE-PHASE VOLTAGE RESPONSIVE SPEED SENSOR
Filed May 6, 1959

INVENTOR
WILLIAM C. PECK
BY Harris F. Lucker
ATTORNEY

United States Patent Office 3,044,013
Patented July 10, 1962

3,044,013
THREE-PHASE VOLTAGE RESPONSIVE SPEED SENSOR

William C. Peck, Hazardville, Conn., assignor to United Aircraft Corporation, East Hartford, Conn., a corporation of Delaware
Filed May 6, 1959, Ser. No. 811,474
4 Claims. (Cl. 324—70)

This invention relates to a speed sensing circuit, and more particularly to a circuit responsive to the frequency and amplitude of an electrical impulse which is related to the speed to be sensed. The electrical speed sensing circuit will produce an output signal indicative of any variations in speed from a preselected value and the circuit is used especially in conjunction with a fuel control system for maintaining the speed of an aircraft engine in predetermined relationship to the preselected speed, which is subject to continual variation by the pilot.

For use with a jet engine, it is essential to have rapid response of the fuel metering equipment to input command signals or to disturbances. In addition, it is desirable to prevent the control system from responding to inherent fluctuations such as ripple. These two requirements tend to be in conflict. The incompatability is emphasized when using a tachometer generator whose frequency is relatively low as a speed transducer.

For economy and size and weight considerations, it is frequently very desirable to use the same tachometer generator which supplies the cockpit tachometer indicator as the speed transducer for the fuel control system. The frequency at minimum speed from such a standard tachometer generator is quite low and well within the response region of a high performance servo system. To permit the servo system to respond to the ripple from the tachometer generator system would wear the mechanical parts unduly and increase maintenance frequency and cost.

It is therefore an object of this invention to provide means for increasing the inherent ripple frequency produced by rectification of the tachometer generator signal beyond the region of servo system response so that no compromise of the response of the servo system is necessary in order to prevent undesired fluctuation.

Another object of this invention is to produce a signal indicative of the magnitude and direction of deviation of the engine speed from a preselected control value.

Another object of this invention is to provide a speed sensing circuit in which random variations in wave form of the speed signal have a negligible effect on the sensitivity and response of the circuit.

A further object of this invention is to provide a speed sensing circuit having a fast response and which does not require the use of filtering networks.

Another object of this invention is an electrical network utilizing a frequency variable reactance to provide a stable reference signal unaffected by frequency variations.

A still further object of this invention is a speed sensing circuit whose response can be adjusted to select any desired speed as the control speed.

Figure 2:
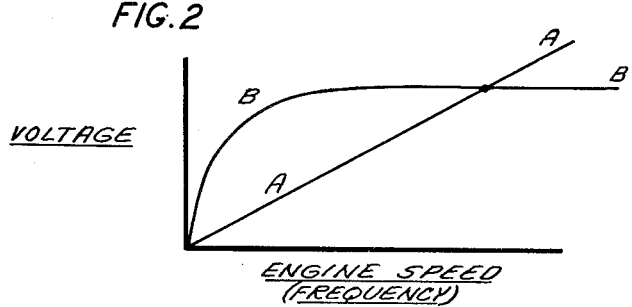

These and other objects and a fuller understanding of the invention may be had by referring to the following description and claims taken in conjunction with the accompanying drawings in which:

FIG. 1 is a schematic wiring diagram of the preferred embodiment of the speed sensing circuit; and FIG. 2 is a graphical description of the operating characteristics of the speed sensing circuit.

A standard engine-driven tachometer generator 10 creates a three-phase A.C. signal having an amplitude and frequency which will vary in direct proportion to the engine speed. The three-phase A.C. signal is fed directly to a full-wave diode rectifier circuit 18 through lines 12, 14 and 16, each of which is connected to one of the three generator windings 20, 22 and 24. A fixed resistor 26 and potentiometer 28 are placed in series across rectifier circuit 18 and the full voltage drop of the rectified D.C. signal will be across resistor 26 and potentiometer 28. Arm 30 of potentiometer 28 is adjustable and will transmit the selected portion of the voltage drop across potentiometer 28 through line 32 to one side of winding 34, illustrated as point A. The D.C. voltage at this point is proportional to the amplitude of the three-phase A.C. signal, and will vary directly as the speed to be sensed. Winding 34 may be the signal or input winding of a magnetic modulator.

FIG. 2 shows graphically that the voltage at point A varies linearly with engine speed. There are no reactive elements in the circuit thus far described, and the voltage at point A will thus depend on the amplitude of the output signal from generator 10. As the engine speed increases, the voltage at point A increases in direct proportion to the speed increase.

A single-phase portion of the three-phase A.C. voltage signal is fed from across lines 12 and 14 to primary winding 36 of step-up transformer 38. The stepped-up voltage output from secondary winding 40 passes through a frequency responsive circuit comprising series resistor 42 and capacitor 44. The voltage step-up is necessary to increase the sensitivity of the frequency responsive circuit. The frequency and amplitude of the A.C. signal from transformer 38 are proportional to the speed of the engine as sensed by tachometer generator 10, so that both the frequency and amplitude of the voltage signal will increase with an increase of engine speed. Capacitor 44 is chosen so that its reactance will decrease with an increase in frequency in proportion to the increase in signal amplitude which occurs as the frequency increases, and there will be a constant voltage drop across capacitor 44. A full-wave bridge rectifier 46 is connected across capacitor 44, and the rectified D.C. signal output is fed across potentiometer 48. An advantage of a bridge rectifier over conventional full-wave rectifiers is that with a given transformer the bridge circuit will produce a voltage output nearly twice that of the conventional full-wave circuit, and the inverse voltage across the diodes of the bridge rectifier is about half the inverse voltage of the conventional full-wave rectifier. Arm 50 of potentiometer 48 can be adjusted to vary the portion of the D.C. voltage picked off from potentiometer 48. This voltage is fed to point B of winding 34 through line 52. A common line 54 joins one side of bridge rectifier 46 with one end of full-wave rectifier 18 and provides a common voltage reference point.

FIG. 2 illustrates how the voltage at point B of winding 34 varies with engine speed. After an initial increase, the voltage at point B becomes relatively constant for all engine speeds in the normal operating range, and is independent of frequency and signal amplitude. This effect is due to the action of capacitor 44 as described above.

As can be seen by reference to FIG. 2, at one particular engine speed the voltage at points A and B of winding 34 are identical, and at this speed there will be no voltage drop across or current flow through winding 34. This point where lines A and B intersect will be at the preselected engine speed. If the speed of the engine changes, the voltage at point A will vary in direct proportion to the change in speed, while the voltage at point B will remain fixed thus creating a voltage drop across winding 34 and a current will now flow with magnitude and direction indicative of the amount and direction of speed variation.

The control speed can be adjusted by adjustment of arms 30 or 50 of potentiometers 28 or 48 or both, and this will enable the pilot to select the speed at which no signal will occur across winding 34. Each setting of potentiometer 48 will change the reference voltage at point B while adjustment of potentiometer 28 will change the slope of line A, each setting resulting in a different point of intersection of the curves and a different control speed.

This circuit is intended to avoid difficulties that appear at relatively low frequency, of the order of 18 cycles per second, when using a standard engine-driven tachometer generator as the speed transducer. Proper operation of the circuit depends on the reference voltage at point B being held constant over the frequency range of engine operation. In order that this may be true, it is necessary to cause the knee of the curve of volts vs. frequency for line B of FIG. 2 to occur at a low frequency, perhaps 12 cycles per second. This, of course, means that attenuation of the generator signal is severe, that the resulting reference voltage is low, and that the slope of the volts vs. frequency line A is low. The slope of volts vs. frequency in line A is a measure of the sensitivity of the speed sensing circuit. In order that the sensitivity of this circuit be compatible with the threshold of the unit which commonly follows, a magnetic modulator, and also to minimize the additional amplification required, it is essential to increase the sensitivity of this speed sensing circuit. Interposing a step-up transformer 38 between the tachometer generator 10 and RC divider 42, 44 raises the voltage applied to the RC divider, thereby raising the reference level of line B and permitting a greater volts vs. frequency slope of line A and a greater sensitivity for the speed sensing circuit.

The selection and use of a three-phase signal in the speed sensing circuit and full-wave three-phase rectifier 18 is necessary in order to avoid a high amplitude ripple being applied to winding 34. The pulsating D.C. output of a fully rectified three-phase signal has ripple frequency six (6) times that of a conventional rectified single-phase signal. The amplitude of the ripple is correspondingly less in the three-phase system. A much more stable signal thus results from the use of the three-phase system and it is unnecessary to incorporate filtering networks which would add undesirable delay and expense and directly affect the speed of response of the circuit. Thus the dynamics of the speed sensing circuit have no effect whatever on the control system performance. Ripple is not a problem in the single-phase portion of the circuit, since the frequency stabilized reference voltage which is fed to point B of winding 34 is relatively constant and does not need filtering. As a result, the control system does not respond to ripple or other inherent noise of this character.

A particularly advantageous feature of this circuit is the fact that both the three-phase frequency responsive and the single-phase reference voltage portions of the circuit are fed by the tachometer generator 10 so that any random variations in the wave form of the signal produced by generator 10 will affect both portions of the circuit and will have a negligible effect on the null point and sensitivity of the circuit. This is an obvious advantage over systems which use a constant voltage from an outside source for the reference voltage.

Although this invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim:

1. A speed sensing circuit comprising a source of three-phase alternating input voltage having a frequency and amplitude which are a function of speed, a rectifier circuit connected with said input voltage for converting said input voltage into a first direct current signal which varies directly with speed, a step-up transformer connected with one phase of said three-phase input voltage, a resistor and capacitor connected in series with the output of said transformer, said capacitor having a capacitance which varies the reactance of said capacitor inversely with frequency in proportion to the variation in the amplitude of the input voltage as the frequency of said input voltage varies, the voltage across said capacitor thereby remaining substantially constant, a full-wave bridge rectifier for converting the voltage across said capacitor into a second direct current signal, and means for comparing said first signal and said second signal to thereby produce an output signal.

2. A speed sensing circuit as in claim 1 including means to vary the portions of said first and second signals which are compared and thereby increase the sensitivity of said circuit.

3. A speed sensing circuit as in claim 2 in which the amplitude of the input voltage is insufficient to cause saturation of said step-up transformer.

4. A speed sensing circuit comprising a source of three-phase alternating input voltage having a frequency and amplitude which are a function of speed, a first circuit including a rectifier connected with said three-phase input voltage for converting said input voltage into a first direct current signal which varies directly with speed, a first potentiometer connected across said rectifier, said first potentiometer having an adjustable arm for feeding a selectable portion of said first signal to an output circuit, a second circuit connected with one phase of said three-phase input voltage for producing a substantially constant direct current reference signal, said second circuit including a step-up transformer for raising the voltage level of said reference signal, a resistor and capacitor connected in series with the output of said transformer, said capacitor having a capacitance which varies the reactance of said capacitor inversely with frequency in proportion to the variation in the amplitude of the input voltage as the frequency of said input voltage varies, a full-wave bridge rectifier connected across said capacitor for converting the capacitor voltage into said direct current reference signal, and a second potentiometer connected across said bridge rectifier, said second potentiometer having an adjustable arm for feeding a selectable portion of said reference signal to said output circuit, said output circuit including a coil for comparing the selected portions of said first signal and said reference signal to thereby produce an output signal.

References Cited in the file of this patent

UNITED STATES PATENTS

| | | |
|---|---|---|
| 548,511 | Boucherot | Oct. 22, 1895 |
| 2,088,621 | Stocker | Aug. 3, 1937 |
| 2,467,753 | Kirschbaum | Apr. 19, 1949 |
| 2,525,451 | Graves | Oct. 10, 1950 |
| 2,709,776 | Evans et al. | May 31, 1955 |
| 2,725,515 | Horton | Nov. 29, 1955 |
| 2,747,156 | Grady | May 22, 1956 |
| 2,749,500 | Eagen | June 5, 1956 |
| 2,763,827 | Evans | Sept. 18, 1956 |
| 2,803,297 | Gulliksen et al. | June 8, 1957 |
| 2,843,760 | Kahle | July 15, 1958 |
| 2,943,281 | Boyer | June 28, 1960 |
| 2,966,625 | Kelly | Dec. 27, 1960 |